(12) United States Patent
Cove et al.

(10) Patent No.: US 6,648,070 B2
(45) Date of Patent: Nov. 18, 2003

(54) INSERT ASSEMBLY FOR A WELLHEAD CHOKE VALVE

(75) Inventors: Harry Richard Cove, Edmonton (CA); Loren G. Kowalchuk, Edmonton (CA)

(73) Assignee: Master Flo Valve Inc., Edmonton (CA)

( * ) Notice: Subject to any disclaimer, the term of this patent is extended or adjusted under 35 U.S.C. 154(b) by 57 days.

(21) Appl. No.: 09/996,468

(22) Filed: Nov. 27, 2001

(65) Prior Publication Data

US 2003/0098151 A1 May 29, 2003

(51) Int. Cl.[7] .................................................. E21B 34/04
(52) U.S. Cl. ........................................ 166/86.1; 166/91.1
(58) Field of Search .............................. 166/86.1, 76.1, 166/88.1, 91.1, 316, 330, 332.2, 332.5, 334.2, 334.4

(56) References Cited

U.S. PATENT DOCUMENTS

| | | | | |
|---|---|---|---|---|
| 4,337,788 A | * | 7/1982 | Seger | 137/315 |
| 4,461,450 A | * | 7/1984 | Soland et al. | 251/63.5 |
| 4,617,992 A | * | 10/1986 | Abel | 166/95 |
| 5,971,077 A | * | 10/1999 | Lilley | 166/368 |

* cited by examiner

Primary Examiner—Frank Tsay
(74) Attorney, Agent, or Firm—Sheridan Ross PC

(57) ABSTRACT

A reverse flow insert assembly is provided wherein the flow trim of the choke valve is positioned horizontally within the tubular cartridge, so that the cage bore outlet is aligned with the valve body side opening. A collar is provided to throttle the flow ports of the cage. The valve stem assembly is adapted to bias the collar along the horizontal side wall of the cage. The resulting insert assembly can be positioned in the valve body to modify the valve for fluid injection service on a sub-sea wellhead.

2 Claims, 4 Drawing Sheets

INSERT ASSEMBLY FOR A WELLHEAD CHOKE VALVE

BACKGROUND OF THE INVENTION

The present invention relates to modification of the insert assembly of a choke valve used in connection with an underwater wellhead.

Choke valves are flow throttling devices. They function to control flow and reduce the pressure of the fluid moving through them. When the pressure is reduced the velocity of the fluid increases.

The fluid moving through a choke valve can often be severely erosive. For example, a choke valve may be used to control a gas flow containing entrained sand and moving at high pressure and velocity.

It follows that a choke valve is a critical piece of wellhead flow control equipment, which must be designed and constructed to cope with an erosive flow such as that just described.

As mentioned, choke valves are used in underwater or sub-sea service. In early times, the wellheads were located at depths less than 100 feet. It was possible for divers to manually service the choke valves. However, today wellheads may be located at depths as great as 6000 feet. At these greater depths, wellhead servicing has to be carried out using an unmanned, remotely operated vehicle, referred to as an "ROV".

At this point it is appropriate to shortly describe the main parts of a modern known choke valve used in sub-sea service. This valve is illustrated in FIG. 1.

The choke valve is designed to be vertically oriented in use, so that its operating parts can be removed and replaced as a unit using a vertical cable extended from surface.

The choke valve comprises the following elements:

A body is provided having a T-shaped arrangement of bores providing a horizontal side inlet, a vertical bottom outlet and a vertical chamber for containing operating components. The inlet and outlet bores have an inverted L-shaped configuration;

A generally tubular cartridge is vertically positioned in the chamber and extends across the side inlet. The cartridge side wall forms a side port connecting with the inlet;

A 'flow trim' is positioned within the bore of the cartridge.

The flow trim comprises a stationary tubular cylinder referred to as a nozzle or 'cage'. The cage is seated on an internal shoulder formed by the lower end of the cartridge. It extends across the inlet and its bore is vertical, being axially aligned with the outlet. The cage has flow ports extending through its side wall. The cage flow ports communicate through the cartridge port with the inlet. Fluid enters the cage bore from the horizontal inlet through the flow ports, changes direction within the cage and leaves through the vertical body outlet. In moving through the flow ports, the fluid pressure is reduced and its velocity is increased, thereby increasing the erosiveness of the stream. The flow trim further comprises a vertically oriented, tubular, external sleeve, having one closed end. The sleeve can slide along the cage side wall to throttle the ports;

A bonnet assembly is secured to the cartridge and closes the upper end of the body chamber. The bonnet assembly is also secured to the body by clamp means which can be undone by the ROV, to release the bonnet assembly from the body;

A stem extends through an opening in the bonnet assembly and connects with the flow trim sleeve. An actuator (not shown), powered by a hydraulic system operated from surface, can rotate the stem to advance and retract the sleeve, thereby adjusting the open area of the cage flow ports.

The cartridge and its contained components, as just described, can be referred to as a 'production insert assembly'.

Now, the valve body is formed of softer, more ductile steel than is the flow trim. The reason for this is that the body needs to be machined in the course of fabrication and it also has to be able to cope with stresses. The flow trim however has harder surfaces. Typically the sleeve is formed of tungsten carbide and a tungsten carbide liner is shrink-fitted to line the cage bore. This is necessary because the flow trim is positioned at the bend of the "L", where it is exposed to and temporarily contains the fluid flow when it is accelerated, is changing direction and is in a turbulent state.

When a sub-sea well is first completed, the subterranean formation containing the oil or gas will typically be at sufficient pressure to drive the produced fluid to surface. The well is referred to as a "flowing" well. However, over time the formation pressure will diminish. Eventually it may be desirable to inject water or other fluid into the formation, through one or more wells, to increase its pressure and maintain the formation flowing capability.

This requires that fluid be pumped under pressure or 'injected' through the choke valve in the opposite or reverse direction. If this is done with the valve shown in FIG. 1, the fluid exits the partly closed ports of the flow trim as high velocity, angled jets that impinge against and will erode the material of the choke body.

To try to reduce the erosion when a well is converted to reverse flow, well operators have resorted to operating the choke valve with a reduced pressure drop. However this is an undesirable restriction.

The present invention is concerned with providing a reverse flow insert assembly which can replace the production insert assembly when the well is to be changed from production to injection.

SUMMARY OF THE INVENTION

In accordance with the invention, a cage, closed at one end, is positioned, in use, in a vertically oriented cartridge so that the side wall of the cage is horizontal and its open end registers and communicates with the cartridge port and the body side opening (formerly the 'inlet'). A flow control collar is positioned around the cage. The stem assembly is adapted to enable the rotary drive of the actuator to advance and retract the collar in a horizontal direction to throttle the cage flow ports.

As a result of this arrangement, fluid, pumped in through the bottom opening (formerly the 'outlet') of the choke body, passes through the cage flow ports and is accelerated, but it is temporarily contained within the hard surface of the cage, before exiting through the cage open end as a generally linear flow. In this way, erosion of the body is reduced.

The cartridge, the horizontally arranged flow trim, the bonnet assembly and the stem assembly combine to form a reverse flow assembly. This assembly can be lowered as a unit by cable from surface, dropped into place in the choke body and be secured in place using the ROV. Thereafter fluid can be pumped in a 'reverse' direction into the well, without pressure drop restrictions and with reduced erosion effect.

DESCRIPTION OF THE PREFERRED EMBODIMENT

Figure 1:
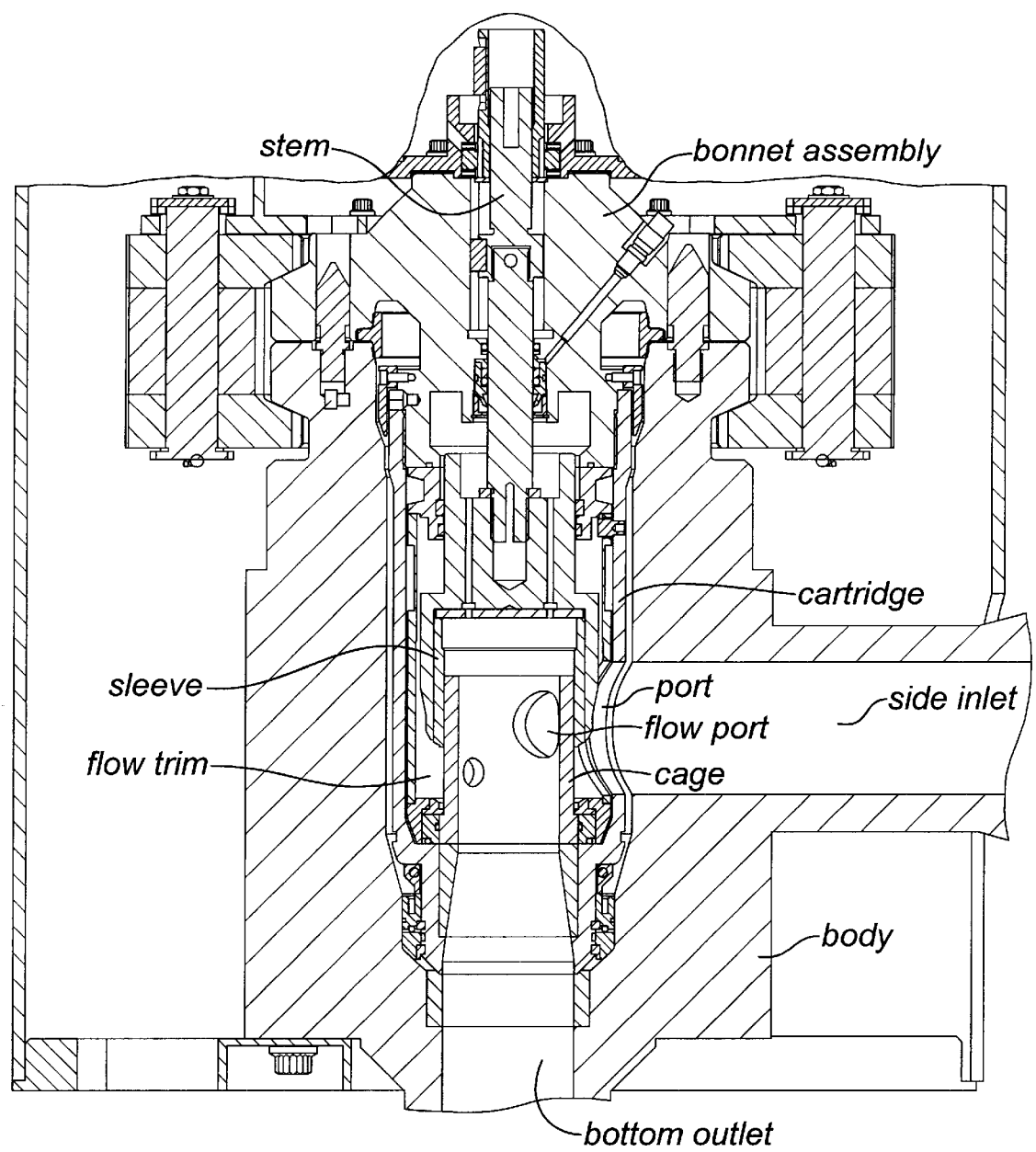
FIG. 1 is a sectional side view of a prior art production insert assembly positioned in the body of a choke valve, as it would be used to control flow through a wellhead (not shown) when it is in the production mode.
Figure 2:
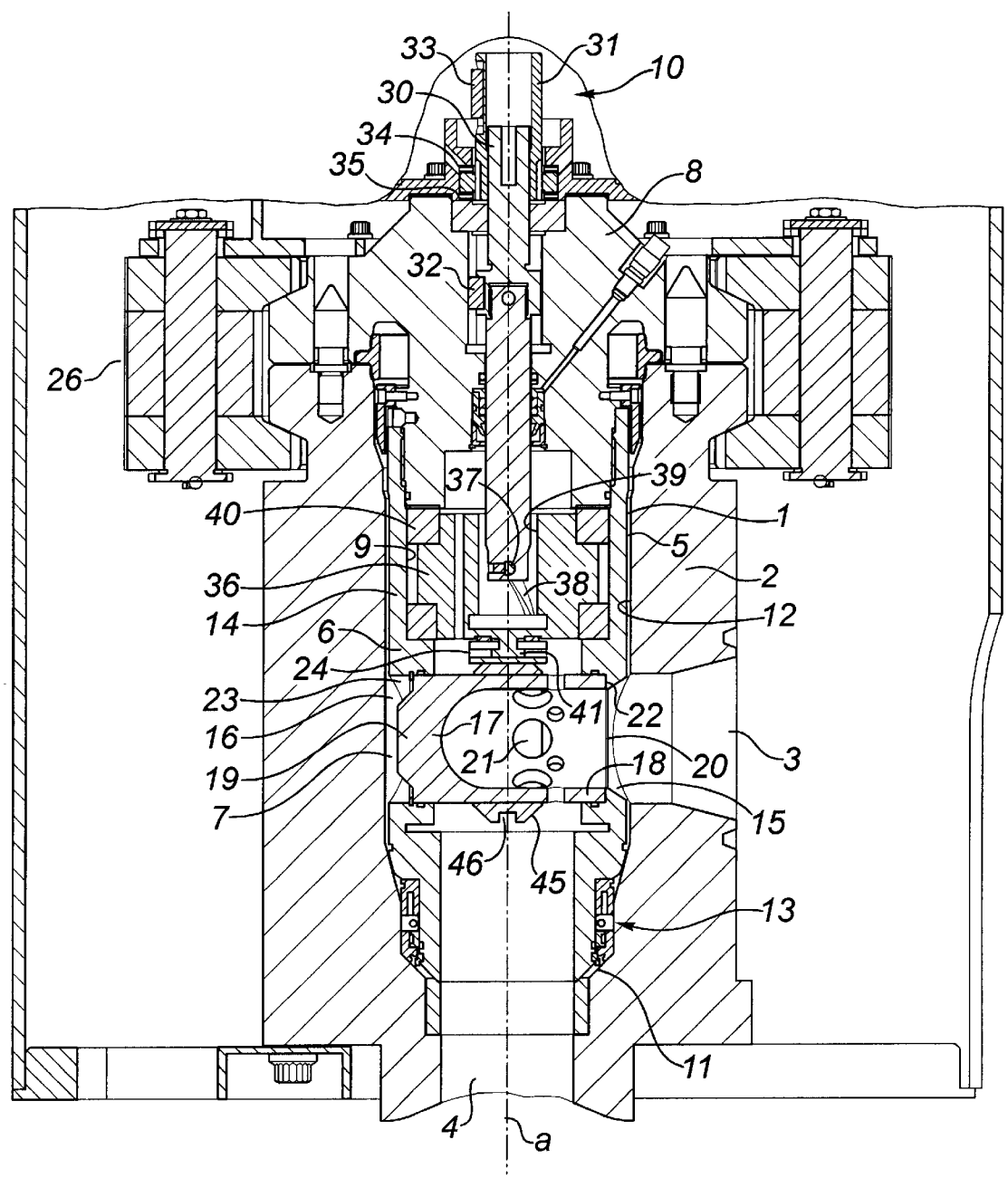
FIG. 2 is a sectional side view similar to FIG. 1 but showing a reverse flow insert assembly in accordance with the invention, as it would be used to control flow through a wellhead when it is in the injection mode.

The invention is concerned with a reverse flow insert assembly 1 to be positioned in a choke valve body 2. The valve body 2, when mounted to a wellhead (not shown), forms a T-shaped arrangement of bores comprising a horizontal side opening 3, a bottom opening 4 and a component chamber 5, as shown in FIG. 2.

The insert assembly 1 comprises a tubular cartridge 6, a flow trim 7 positioned within the cartridge 6, a bonnet 8 closing the upper end of the cartridge bore 9, and a stem assembly 10.

More particularly, the cartridge 6 is vertically oriented and seats on an internal shoulder 11 of the body 2. The lower end of the cartridge is sealed to the body internal surface 12 by a ring and seal assembly 13. The cartridge side wall 14 forms a side port 15 which registers and communicates with the body side opening 3. The side wall 14 also forms an assembly opening 16 to enable insertion of the cage 17.

The cage 17 is tubular, having a side wall 18 forming a bore and an end wall 19 closing one end of the bore. At its opposite end the side wall 18 is open and form an outlet 20. The side wall 18 further forms flow ports 21 intermediate its ends. The cage 17 is positioned horizontally. Its outlet 20 registers and communicates with the cartridge side port 15 and the body side opening 3. The cage 17 is inserted through the cartridge opening 16, through the flow control collar 45 and seats against a cartridge shoulder 22. It is locked in place by a retaining ring 23. The cage 17 extends transversely across the cartridge bore 9.

A flow control collar slider 24 extends around the cage side wall 18 and is slideable therealong to throttle the flow ports 21. The means for biasing the collar slider 24 to cause it to slide along the cage is described below.

The bonnet assembly 8 extends part-way into the cartridge bore 9 and seats against a body seal ring 25 forming the upper end of the valve body 2. A clamp 26 locks the bonnet assembly 8 to the body seal ring 25. This clamp 26 can be opened and removed by an ROV.

The means for biasing the collar slider 24 is the stem assembly 10.

More particularly, at its upper end the stem assembly 10 comprises a threaded stem 30 and a mated threaded jack nut 31. The stem 30 is locked against rotation by an anti-rotation key 32 secured to the bonnet assembly 8. The known actuator (not shown) produces rotary motion and is connected through a key 33 to the jack nut 31. The jack nut 31 is held in place by thrust bearings 34, 35 on both top and bottom. Rotation of the jack nut 31 by the actuator initiates linear motion of the stem 30 along the axis of the body bottom opening 4.

Figure 3:
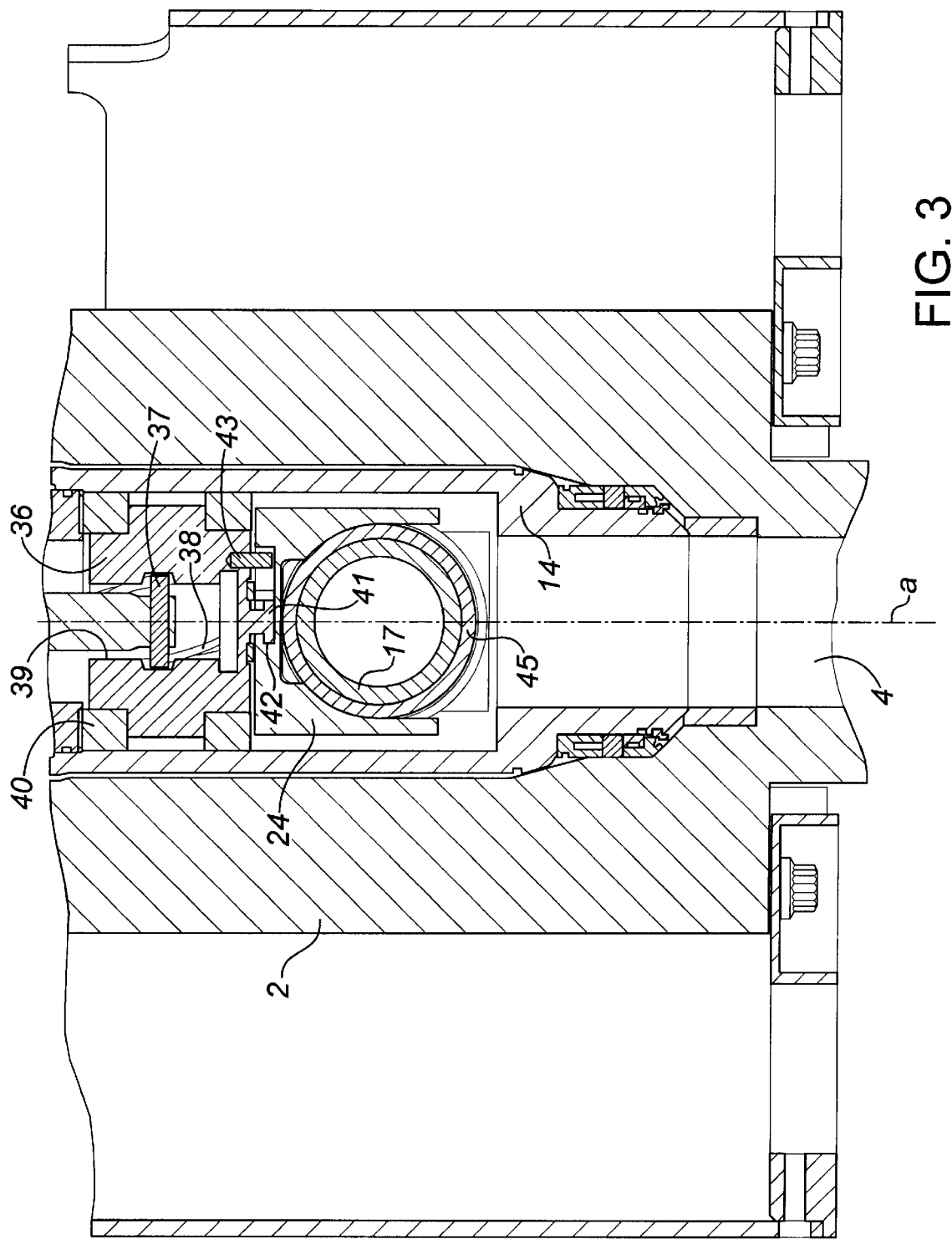
FIG. 3 is a side sectional view showing details of the bottom end of the stem, the drive collar and the collar slider.
Figure 4:
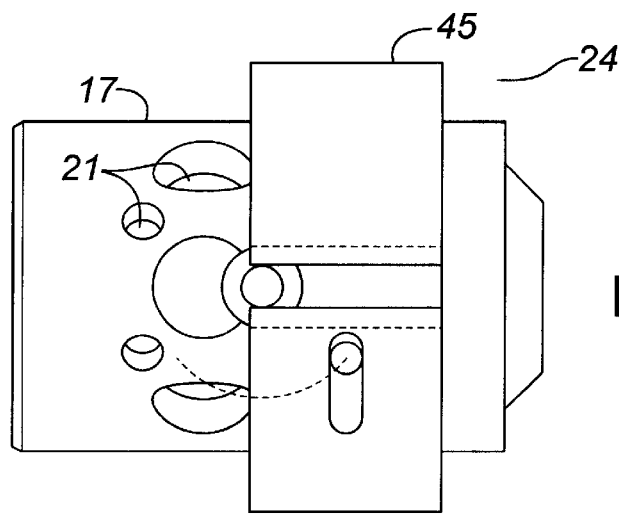
FIG. 4 is a simplified plan view showing the flow control collar and collar drive pin in the fully open position.
Figure 5:
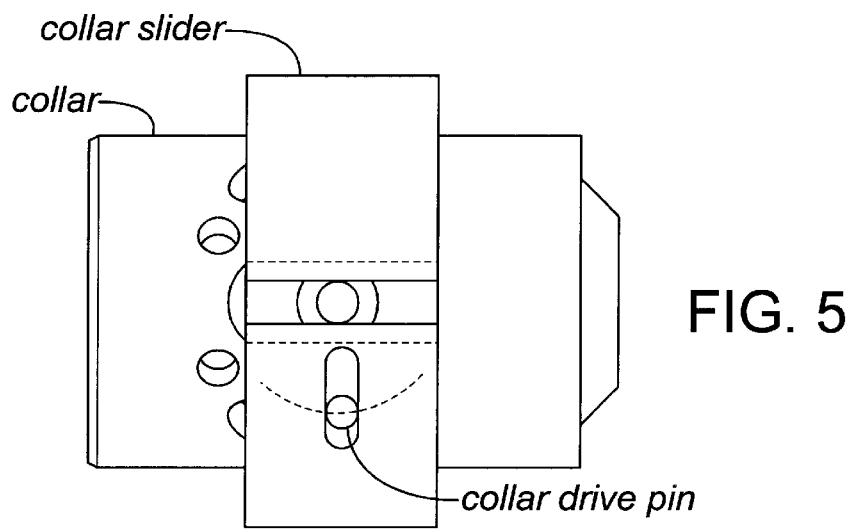
FIG. 5 is a view similar to FIG. 4, showing the flow control collar and collar drive pin in the mid-travel position.
Figure 6:
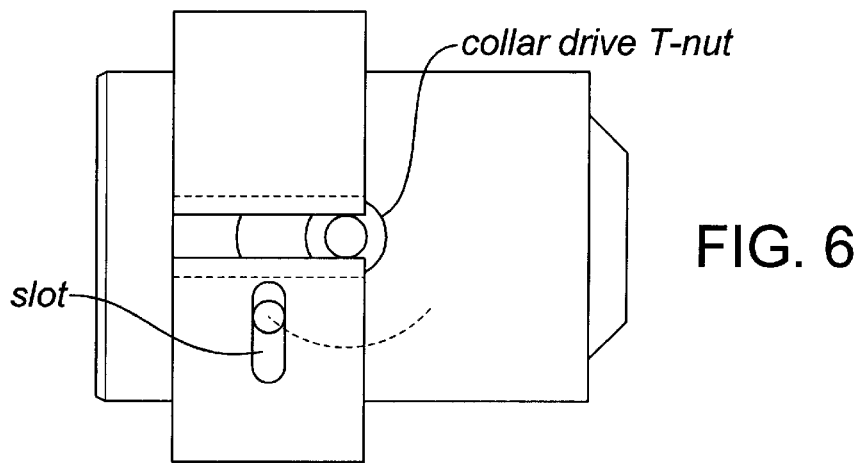
FIG. 6 is a view similar to FIG. 4, showing the flow control collar and collar drive pin in the fully closed position.

The bottom end of the stem 30 is contained within a collar drive 36 by a stem drive pin 37 (see FIG. 3). The collar drive 36 has two opposed slots 38 on its inner diameter surface 39, which the stem drive pin 37 engages. These slots 38 are helical and have a pitch, so that, as the stem 30 moves linearly along its axis inside the collar drive 36, the stem drive pin 37 forces the collar drive 36 to rotate about the body bottom opening axis a. The collar drive 36 is constrained by the two collar bushings 40 to rotate about the body bottom opening axis a. In this manner, the linear motion of the stem 30 produces rotary motion at the collar drive 36. The extent of rotation is set by the pitch of the helical slots 38 within the collar drive 36 and the length of travel of the stem 30.

As shown in FIG. 3, the bottom of the collar drive 36 ends in a cylindrical T-shaped tongue 41, which is fitted to a T-slot 42 in the collar slider 24. In addition, the bottom of the collar drive 36 has a pin 43 that engages a groove 44 in the top of the collar slider 24. This pin 43 is offset from the axis a and, as the collar drive 36 rotates, the pin 43 scribes an arc. As the pin 43 travels along this arc, it moves inside the groove 44 of the collar slider 24. By its orientation, the groove 44 traps the pin 43 in directions parallel to the axis of the cage 17 but allows the pin 43 to move freely in perpendicular directions to the cage axis. In this manner, only the forces which act parallel to the axis of the cage 17 act on the collar slider 24, positioning it along the cage side wall 18. Intuitively, this arcuate pin motion would not seem to produce linear motion, but because the tongue 41 in the collar drive 36 is stationary over the axis a, the collar slider 24 is constrained to motion along the axis of the cage 17 only.

The collar slider 24 is fork-shaped and has symmetrical fingers that fit over the flow control collar 45 and engage a groove 46 in its outside surface. As the collar slider 24 is positioned along the axis of the cage 17 by the collar drive 36, it in turn moves the flow collar 45.

The embodiments of the invention is which an exclusive property or privilege is claimed are defined as follows:

1. A reverse flow insert assembly for use in the body of a choke valve mounted on a wellhead, the body forming a T-shaped bore comprising a vertically extending bottom opening and component chamber and a horizontally extending side opening, said insert assembly comprising:

a tubular cartridge for seating in the component chamber, the cartridge having a side wall forming a bore and a side port located to register with the body side opening, the cartridge having upper and lower ends;

a flow trim positioned in the cartridge bore, the flow trim comprising a cage having a tubular horizontal side wall forming a bore and an end wall closing one end of the bore, the cage side wall forming side opening flow ports and an outlet at it's the other end of the bore, said outlet registering with the cartridge side port and body side opening, the flow trim further comprising flow control means, mounted to the cage side wall, for sliding therealong to throttle the cage flow ports;

a bonnet secured to the cartridge and closing it's the upper end of the cartridge; and means, extending through the bonnet, for biasing the flow control means so that it slides along the cage side wall.

2. The insert assembly as set forth in claim 1 wherein the flow control means is a collar extending around the cage side wall.

\* \* \* \* \*